United States Patent [19]

Byers

[11] Patent Number: 5,675,643
[45] Date of Patent: Oct. 7, 1997

[54] LINE CARD THAT PROVIDES REMOTE LINE ACTIVATION AND SOFT DIALTONE

[75] Inventor: Charles Calvin Byers, Aurora, Ill.

[73] Assignee: Lucent Technologies Inc., Murray Hill, N.J.

[21] Appl. No.: 413,650

[22] Filed: Mar. 30, 1995

[51] Int. Cl.$^6$ .................................................. H04M 3/22
[52] U.S. Cl. ...................... 379/399; 379/243; 379/336; 379/350; 379/384
[58] Field of Search .................. 379/27, 29, 36, 379/188, 196, 197, 198, 201, 216, 242, 243, 244, 298, 304, 308, 334, 336, 350, 377, 383, 384, 385, 399

[56] References Cited

U.S. PATENT DOCUMENTS

| | | | |
|---|---|---|---|
| 4,334,129 | 6/1982 | De Luca et al. | 379/29 |
| 4,984,266 | 1/1991 | Smith | 379/399 |
| 5,323,460 | 6/1994 | Warner et al. | 379/399 |
| 5,373,501 | 12/1994 | Roland | 379/27 X |
| 5,386,454 | 1/1995 | Childs-Goodrich et al. | 379/27 |

OTHER PUBLICATIONS

"Potential Future Applications of Direct, Automated Service Activation", M. Ahrens, Journal of Network and Systems Management, vol. 1, No. 1, pp. 57–70 Mar. 1993.

"Networks Without Bounds, Soft Dial Tone Service Activation: A Step Toward Re–Systemization", M. Ahrens, IEEE 1992 Network Operations and Management Symposium Record, IEEE Communications Society, pp. 12.3.1–12.3.10 Dec. 1992.

*Primary Examiner*—Krista M. Zele
*Assistant Examiner*—Scott L. Weaver
*Attorney, Agent, or Firm*—Michael B. Johannesen

[57] ABSTRACT

A line card apparatus which provides soft dialtone and automated remote cross-connect capability, comprising one or more line interfaces and a switching matrix which can connect a plurality of lines to the one or more line interfaces. This switching matrix is governed by a controller which can connect each of the plurality of lines to one of the line interface units, and thus, no manual intervention is required. Also, the control unit periodically scans the lines connected to it. If the control determines that there is an offhook condition on any of the lines (whether or not that line is activated), the control notifies the host switch to provide dialtone, which the controller then connects to that line.

11 Claims, 3 Drawing Sheets

LINE CARD THAT PROVIDES REMOTE LINE ACTIVATION AND SOFT DIALTONE

TECHNICAL FIELD

This invention relates to the field of telephone line cards and, more specifically, to provide soft dialtone for non-activated lines and to provide remote activation of lines without having to have manual connections.

BACKGROUND OF THE INVENTION

Subscriber loop carriers (SLCs) provide the primary connection of subscriber telephones to the public switched telephone network (PSTN) for clusters of subscribers. There are many thousands of SLCs used in the United States (and internationally) for such purposes. These SLCs are commonly used to provide telephone service in rural and suburban communities where direct connection to the telephone switching office would be very expensive.

FIG. 1 illustrates a typical prior art SLC 100. SLC 100 is connected to a plurality of subscribers, herein illustrated as homes 102, 104, and 106, in a suburban or rural community. SLCs are also used in urban areas, such as high-density housing units. As will be discussed below, one or more of the telephone lines 108–122 (known in the art as "drops" or "loops") are connected to each subscriber's home. SLC 100 comprises a central office portion 121 and a field or remote portion 123. The remote portion 123 of SLC 100 is housed in a pedestal or enclosure in proximity to the subscribers it serves. The subscriber lines are connected to SLC 100 at a plurality of line cards 124 as known in the art. These SLC line cards 124 are generally similar to line cards found in any prior art switching system and provide the BORSCHT functionality of telephone service (battery, over voltage, ringing, supervision, hybrid, and testing, as known in the art). In the current art, these line cards are plugged into an optical network unit (ONU) 126 which receives and transmits signals to and from the line card, performs translations and prepares the signal for transmission to the host switch. ONU 126 is controlled by control unit 127. A host digital terminal 128 at central office 121 is connected to the optical network via trunks 130, which carry multiplexed signals from line cards 124 on 24 channels. Trunk 130 comprises a high speed link which carries multiple lines. Host digital terminal 128 is connected to a host switch 132. Host switch 132 then connects calls between SLC 100 and the public switched telephone network (PSTN) 134. SLC 100 may be a SLC 96® as available from AT&T, and described in *Bell Laboratories Technical Journal*, Vol. 63, No. 10, Part 2, December, 1984.

Both host switch 132 and SLC 100 are connected to an operation support system (OSS) 136. OSS 136 provides office administration and maintenance functionality, and subscriber update information from a central location. OSS controls, for example, changing subscriber telephone numbers and establishing new service.

In certain new housing developments, especially in the so called "executive estates," many operating companies are installing more than one telephone line or drop to the home. It has been established that many people now have a primary and a secondary, and in some cases tertiary, telephone line. In the example of FIG. 1, there is a primary 108 and secondary 110 line at home 102. There is a primary 112, secondary 114, and tertiary 116 line at home 104, and, likewise, there is a primary 118, secondary 120, and tertiary line 122 at home 106. While three lines are shown in this exemplary embodiment, there may be applications for four or more lines to each customer's premises.

As known in the art, each line card 124 in SLC 100 can provide service for up to four lines, as is shown in the example of FIG. 1. It is also known that not all subscribers will have secondary or tertiary lines activated. Therefore, a manual cross-connect 138 is provided in SLC 100 as a concentration point for the plurality of secondary and tertiary lines. Manual cross-connect 138 is supported by two line cards 124. Therefore, there may be a combination of eight secondary and/or tertiary lines connected through line cards 124 at any one time. There may also be a plurality of manual cross-connects 138 supported by more line cards 124, depending on the configuration of SLC 100 and subscriber patterns.

A problem arises when a subscriber wishes to activate (or deactivate) a secondary or tertiary line. The subscriber, for example, in home 106, notifies the operating company that service is desired on tertiary line 122. The operating company enters the change through OSS 136, which is then propagated to host switch 132 and host digital terminal 128, as is known in the art. The operating company must then send a craft person to the remote portion 123 of subscriber loop carrier 100. The craft person must then open the cabinet and manually connect the tertiary line 122 at manual cross-connect 138. Each time a craft person is sent into the field it costs the operating company far more than the operating company can charge the subscriber for making such a connection. Further, operating companies would like to be able to respond to connection requests immediately. However, if a craft personnel must be sent into the field, delays of days or even weeks may be encountered. Obviously, it is desirable to keep such manual intervention to a minimum.

Therefore, a problem in the art is that secondary and tertiary lines may not be connected at subscriber loop carriers without manual intervention, which takes a long period of time and is expensive.

Further, it has been shown that it is desirable that some form of dialtone be provided on secondary and tertiary lines, even though they are not activated at the central office. In particular, it is desirable that the subscriber be able to call customer service (generally 611) in order to have the line turned up and to call 911 (or other designated number) for emergency service using a line that is not activated. This limited dialtone is referred to as "soft" dialtone, and it would be desirable to maintain this soft dialtone at low cost.

SUMMARY OF THE INVENTION

These problems are solved and a technical advance is achieved in the art by a new line card apparatus which provides soft dialtone and remote cross-connect capability. According to this invention, a line card now includes a switching matrix and controlling mechanism which connects a plurality of lines to one or more line interfaces. This switching matrix is governed by a controller which is, in turn, under the control of the switching device to which it is connected. In this manner, each of the plurality of lines may be connected to one of the line interface units remotely, and thus, no intervention is required.

Also, the control unit may cause periodic scanning of the lines connected to it. If the control determines that there is an offhook condition on any of the lines, the control logic may notify the switching device to provide dialtone, which the controller can then connect to that line. Thus, this invention can provide soft dialtone to nonactive lines.

BRIEF DESCRIPTION OF THE DRAWING

A more complete understanding of the invention may be obtained from the consideration of the following description in conjunction with the drawings in which.

DETAILED DESCRIPTION

Figure 1:
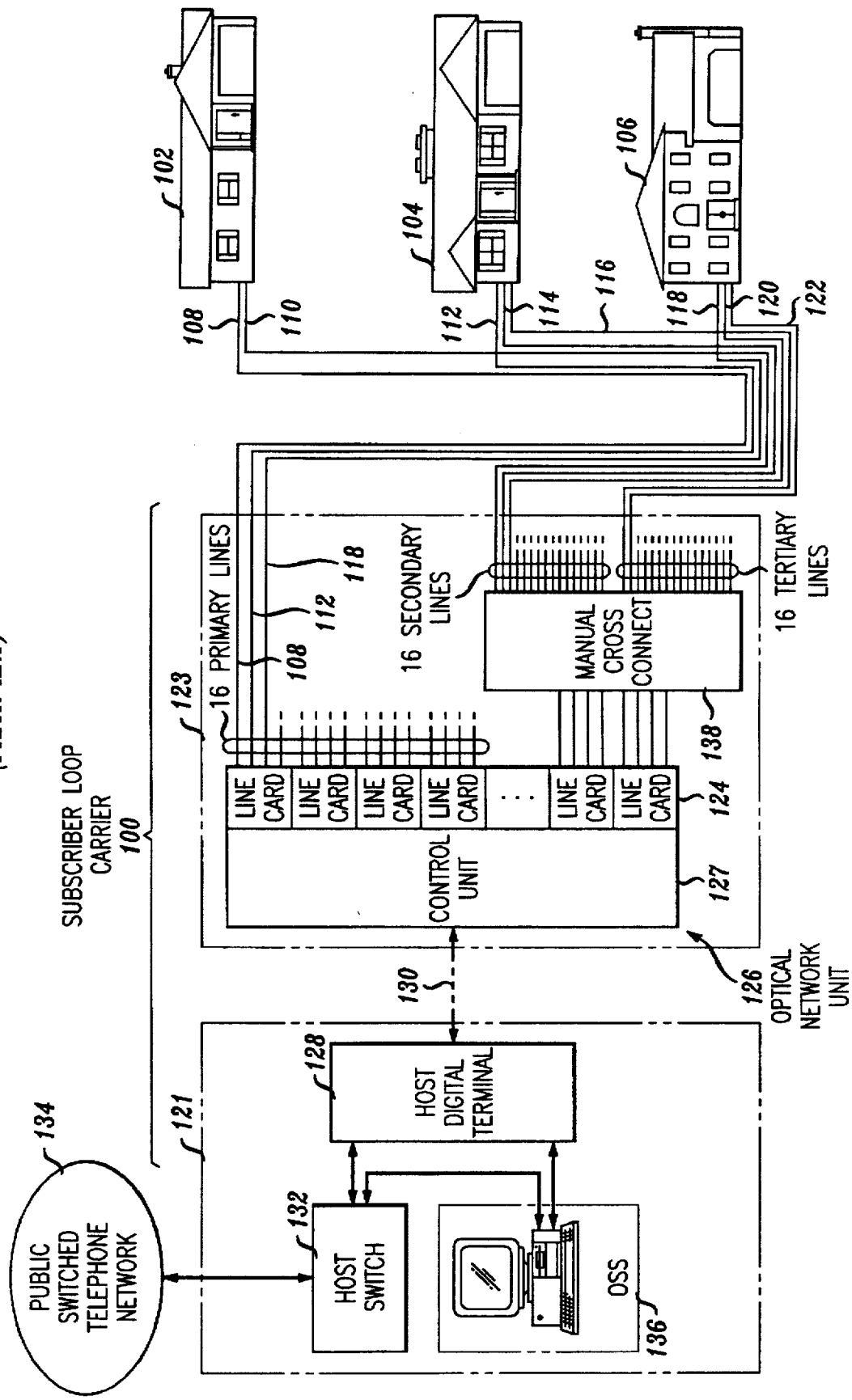
FIG. 1 is a block diagram of a prior art subscriber loop carrier and its connection to the public switched telephone network and subscribers.
Figure 2:
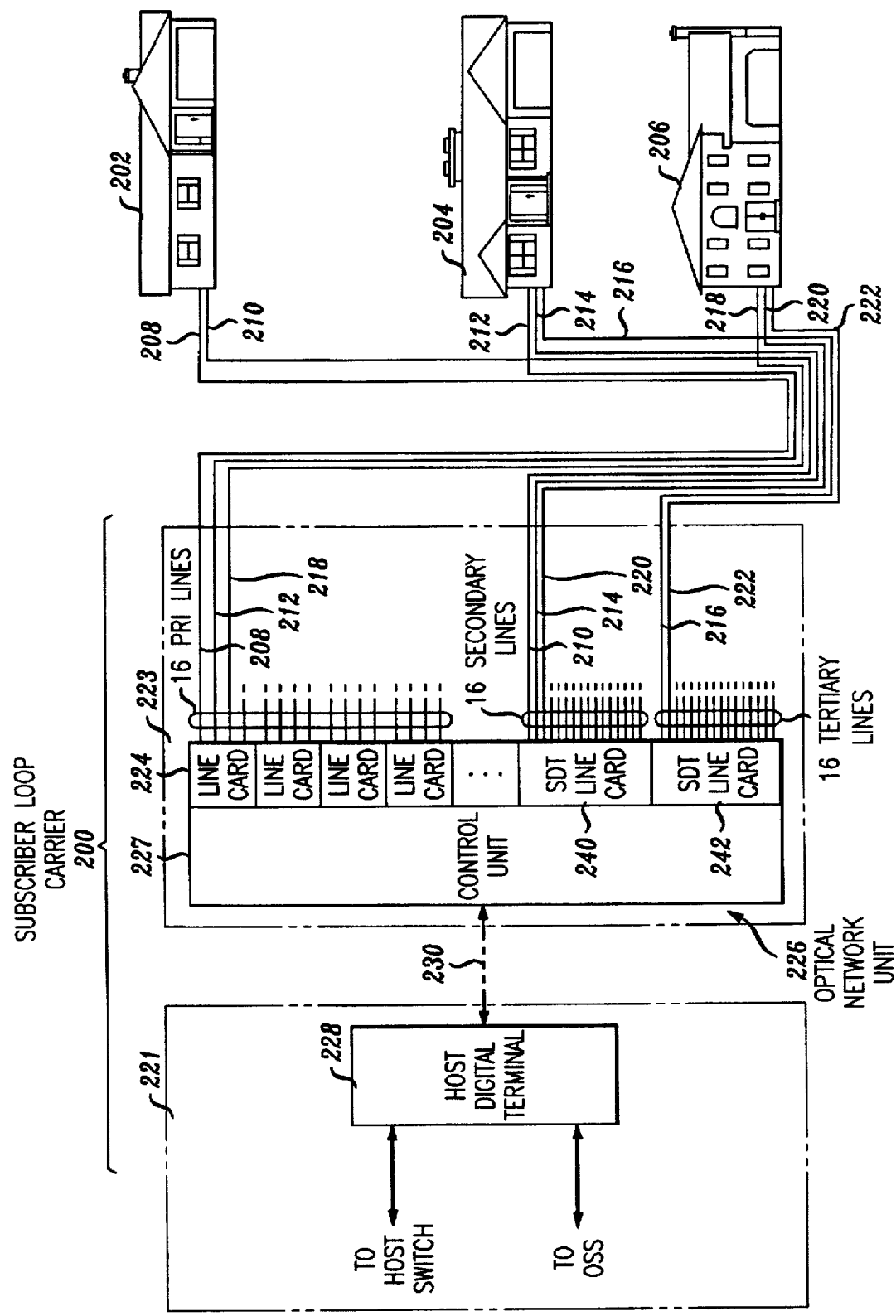
FIG. 2 is a block diagram of a subscriber loop carrier which uses an exemplary embodiment of a line card according to this invention.

FIG. 2 illustrates a subscriber loop carrier (SLC) 200 connected to a plurality of subscriber homes, illustratively 202, 204, and 206. This invention is not necessarily limited to homes, as it may work for businesses or any implementation that utilizes multiple lines per subscriber. SLC 200 is connected to subscribers 202–206 via plurality of primary, secondary, and tertiary lines 208–222, as described above in connection with FIG. 1. Primary lines 208,212, and 218 are connected via line cards 224, as known in the art. Line cards 224 are connected to optical network unit 226, which is, in turn, connected to host digital terminal 228 via trunks 230, as in the prior art. Host digital terminal 228 is also connected to the OSS system, as in the prior art.

This invention is not limited to operating in a SLC environment, as shown. A soft dialtone line card may be used in a central office switch, private branch exchange (PBX), or other similar switching device, as known in the art. This invention is being illustrated in the SLC switching device environment because it is most desirable to have remotely actuatable line connections where the line connections are at a distance from a switching office. However, it is known that many switching offices do not have personnel present at most times. Therefore, it is within the scope of this invention that such applications also use soft dialtone line cards.

According to this invention, there are two soft dialtone (SDT) line cards 240, and 242 connected to optical network unit 226. SDT line cards 240, 242 each support a plurality of lines, which in the exemplary embodiment is 16. Therefore, in this exemplary embodiment, the two SDT line cards 240 and 242 support 16 secondary lines and 16 tertiary lines.

According to this invention, when subscriber 202 wishes to activate secondary line 210, the subscriber calls the operating company and requests service on line 210. According to this invention, the operating company merely needs to send a signal from OSS 136 (FIG. 1) to host digital terminal 228 in order to activate line 210. Host digital terminal 228 receives a message from the OSS and causes optical network unit 226 to cause line 210 to be connected to an available line interface on line card 240 (as will be discussed below in connection with FIG. 3), thus creating a semi-permanent connection ("semi-permanent" is used because it can also be remotely disconnected) to the switching device. Similarly, if subscriber 206 wants to connect tertiary line 222, the operating company sends a message from OSS to host digital terminal 228, which then causes optical network unit 226 to have SDT line card 242 connect line 222 to an available line interface. In this manner, no craft personnel need travel to ONU 223 in order to connect manually any of the lines. Thus, SDT line cards 240 and 242 provide a less expensive method for activating subscriber lines in subscriber loop carriers such as 200.

Additionally, SDT line cards 240 and 242 may provide soft dialtone on secondary and tertiary lines. For example, if subscriber 204 wants to activate tertiary line 216, the subscriber merely plugs a telephone (or other equipment) into line 216. The subscriber at 204 then takes the telephone offhook. Line card 242 periodically scans each line to determine if there is an offhook condition. If there is an offhook condition, control logic (which will be described below in connection with FIG. 3) sends a message through optical network unit 226 to host digital terminal 228. Host digital terminal 228 notifies the host switch of this offhook condition, which then provides dialtone to line 216. In this exemplary embodiment, the host switch is programmed so that the user may only call customer service (usually 611) in order to activate the line or call an emergency number (i.e., 911) in order to make an emergency call. It is also within the scope of this invention that, by providing soft dialtone, the user may also place regular phone calls and be charged on a per-usage basis.

Figure 3:
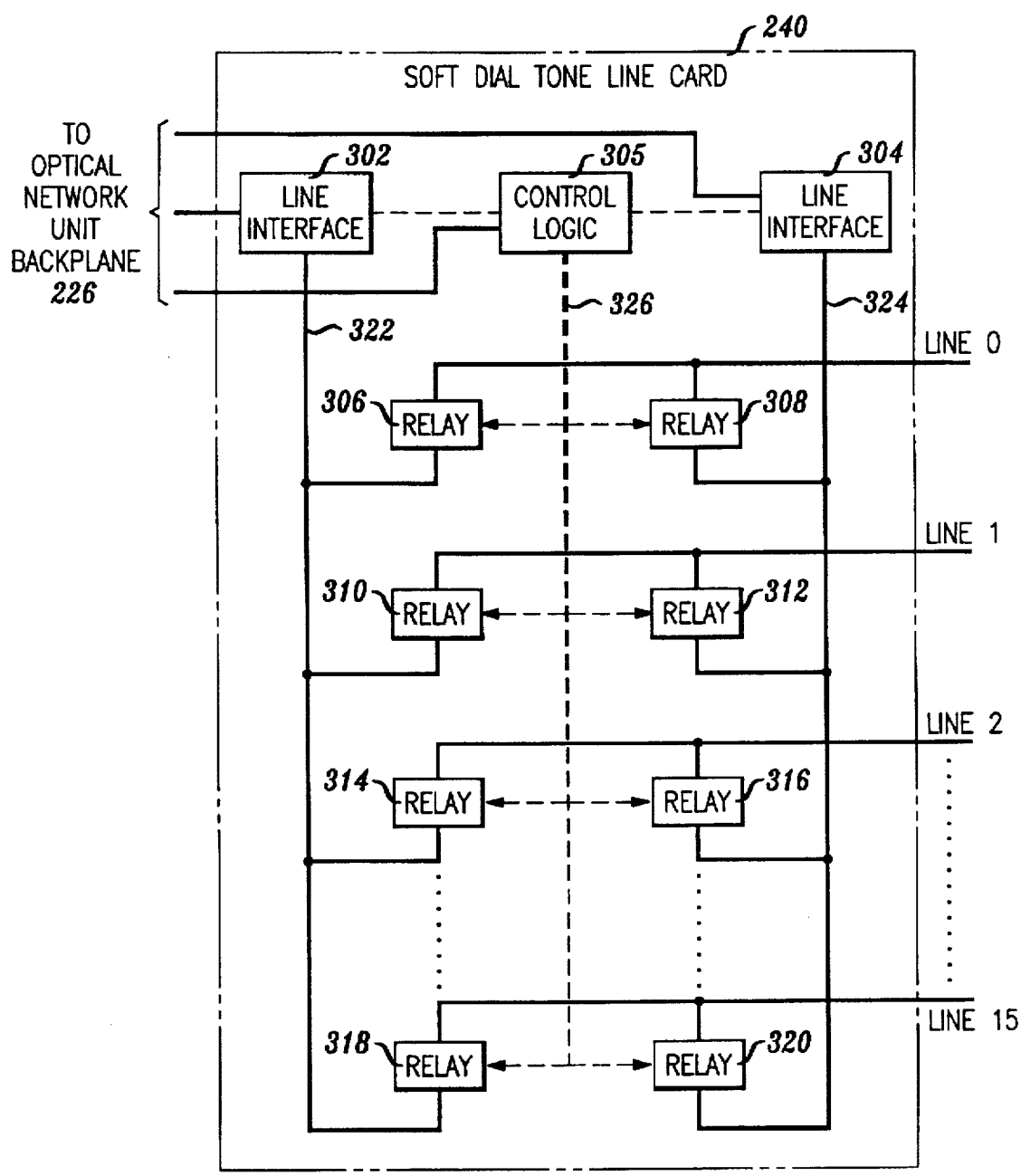
FIG. 3 is a block diagram of a line card illustrating an exemplary embodiment of this invention.

Turning now to FIG. 3, a soft dialtone (SDT) line card 240 is shown in block diagram. Line card 242 (FIG. 2) is identical to line card 240, as illustrated in FIG. 3. SDT line card 240 includes, in this exemplary embodiment, line interface 302 and line interface 304. As circuitry becomes smaller, it is conceivable that more line interface units may be included on line card 240. There may, therefore, be more line interfaces than those illustrated; however, two are shown in the exemplary embodiment. Line interface units 302 and 304 are connected to a plurality of relays 306–320 in this exemplary embodiment, via lines 322 and 324, respectively. Relays 306 and 320 provide connections between line interface lines 322 and 324 with each of lines 0–15 in this exemplary embodiment. Therefore, each of lines 0–15 may be connected to line interface 302 or line interface 304.

Control logic 305 is connected to each relay 306–320 by control bus 326. Control logic causes relays 306–320 to close (or open) by command. Command may be as simple as writing a register wherein each relay recognizes a bit on control bus 322 which causes it to operate. Relays 306–320 may be standard electro-mechanical relays, or may be integrated circuits (such as solid state relays) as are known in the art and will, thus, not be described further.

Host digital terminal 228 (FIG. 2) may keep track of which lines 0–15 are connected to line interface units 302 and 304. The state of relays 306–320 is known to OSS 136, HDT 228, and control logic 305. Control logic 305 generally comprises a control register controlled by control unit 227, but may comprise a processor such as the Motorola 68000 series processor, which includes a small amount of RAM and ROM memory for storing programs which are used to control relays 306–320.

In order to provide soft dialtone, control logic 305 may periodically cause a relay to close, which will connect a line to a line interface unit. For example, assuming that none of lines 0–15 are currently connected to either line interface unit, control logic 305 periodically causes, for example, relays 306, 310, 314, and 318 to close sequentially (or randomly) to determine if there is an offhook condition on any of lines 0–15. By closing relays 306, 310, 314, and 318, each line 0–15 is connected via line interface line 322 to line interface circuit 302. Line interface circuit 302 detects an offhook condition and notifies control logic 305 of the offhook condition and the identity of the line. Control logic 305 notifies host digital terminal 223 (FIG. 2) via optical network unit 226, and dialtone is provided, as described above. Thus, line card 240 can provide soft dialtone and easy and inexpensive connection of secondary and tertiary lines to subscribers served by subscriber loop carrier 100.

It is to be understood that the above-described embodiments are merely illustrative principles of the invention, and that many variations may be devised by those skilled in the art without departing from the scope of this invention. It is, therefore, intended that such variations be included within the scope of the appended claims.

The invention claimed is:

1. A line card apparatus for interfacing one or more telephone lines to a switching device, said line card including a connection to said switching device, said line card comprising:

a plurality of telephone line connections;

at least one line interface unit connected to said switching device connection;

a plurality of switching means, each of said switching means being connected to one of said plurality of telephone line connections and said at least one line interface unit, for selectively interconnecting said plurality of telephone line connections and said at least one line interface unit.

2. A line card apparatus in accordance with claim 1 further including a control means for controlling said plurality of switching means.

3. A line card apparatus in accordance with claim 1 wherein said at least one line interface unit comprises a plurality of line interface units connected to said switching device connection, wherein said plurality of switching means are connected to said plurality of line interface units for selectively interconnecting one of said plurality of telephone lines to each of said plurality of line interface units.

4. A line card apparatus in accordance with claim 1 wherein said plurality of switching means comprises relays operable by commands from an operation support system.

5. A line card apparatus in accordance with claim 1 wherein said plurality of switching means comprises integrated circuit controls operable by commands from an operation support system.

6. A line card apparatus in accordance with claim 1 wherein said switching device comprises a subscriber loop carrier remote from a central office switching system.

7. A line card apparatus in accordance with claim 1 wherein said switching device comprises a central office switching system.

8. A line card apparatus in accordance with claim 1 wherein said switching device comprises a private branch exchange.

9. A line card apparatus in accordance with claim 1 wherein an interconnection of one of said telephone line connections and said at least one line interface unit creates a semi-permanent connection between said switching device and said one of said telephone line connections.

10. A line card apparatus for interfacing a plurality of telephone lines to a switching device, said line card including a connection to a switching system, said line card comprising:

a plurality of telephone line connections;

at least one line interface unit connected to said switching device, said at least one line interface unit being capable of detecting an off-hook condition on a telephone line, whether or not said telephone line is activated at said switching system;

a plurality of switching means, said plurality of switching means being connected to said plurality of telephone line connections and said at least one line interface unit, for selectively interconnecting one of said telephone line connections and said at least one line interface unit; and control means connected to said at least one line interface unit and said plurality of switching means for periodically causing each of said plurality of switching means to connect each telephone line connection to said at least one line interface unit, said at least one line interface unit informing said control means of any detected off-hook condition of one of said plurality of telephone line connections, wherein said control means includes communications means for informing said switching device to provide service to said one of said plurality of telephone lines connections.

11. A line card apparatus for interfacing a plurality of telephone line connections to a switching device, said line card including a connection to said switching device, said line card comprising:

a plurality of telephone lines terminating at said plurality of telephone line connections;

a plurality of line interface units connected to said switching device, said plurality of line interface units being capable of detecting an off-hook condition on a telephone line;

a plurality of switching means, said plurality of switching means being connected to said plurality of telephone line connections and said plurality of line interface units, for selectively interconnecting one of said telephone line connections and one of said plurality of line interface units; and control means connected to said one of said plurality of line interface units and said plurality of switching means for testing said plurality of telephone line connections for an off-hook condition, periodically causing each of said plurality of switching means to connect each telephone line connection to said one of said plurality of line interface units, said one of said plurality of line interface units informing said control means of any detected off-hook condition of one of said plurality of telephone line connections, wherein said control means includes communications means for informing said switching device to provide service to said one of said plurality of telephone line connections, said control means causing one of said plurality of switching means to connect said one of said plurality of telephone line connections to one of said plurality of line interface units; said control means continuing to test the other of said plurality of telephone line connections for an off-hook condition.

* * * * *